United States Patent [19]

Anselrode

[11] 4,164,746

[45] Aug. 14, 1979

[54] APPARATUS FOR PRINTING MATERIALS

[75] Inventor: Lodewijk Anselrode, St. Anthonis, Netherlands

[73] Assignee: Stork Brabant B.V., Boxmeer, Netherlands

[21] Appl. No.: 854,618

[22] Filed: Nov. 25, 1977

[30] Foreign Application Priority Data

Dec. 1, 1976 [NL] Netherlands ........................ 7613401

[51] Int. Cl.[2] .......................................... G01D 15/16

[52] U.S. Cl. ......................... 346/140 R; 101/DIG. 13

[58] Field of Search ............................ 346/140 R, 75; 101/DIG. 13

[56] References Cited

U.S. PATENT DOCUMENTS 3,060,429 10/1962 Winston ............................ 346/75 X 3,738,266 6/1973 Maeda ..................... 101/DIG. 13 X 3,834,301 9/1974 Croquelois ............. 101/DIG. 13 X

*Primary Examiner*—Joseph W. Hartary

*Attorney, Agent, or Firm*—Edmund M. Jaskiewicz

[57] ABSTRACT

An apparatus for printing material comprising a rotating body located above a web of moving material to be printed, said body to be driven rotatingly in such a manner that the circumferential velocity has a component direct toward the direction of motion of the web of material, the wall of the body being provided with a number of capillar drop-dispensing apertures to be fed with the electrically conducting printing fluid and with at least one electrode being arranged in the vicinity of the apertures, as well as means for generating a voltage difference between the fluid and the electrode.

8 Claims, 7 Drawing Figures

Fig. 1.
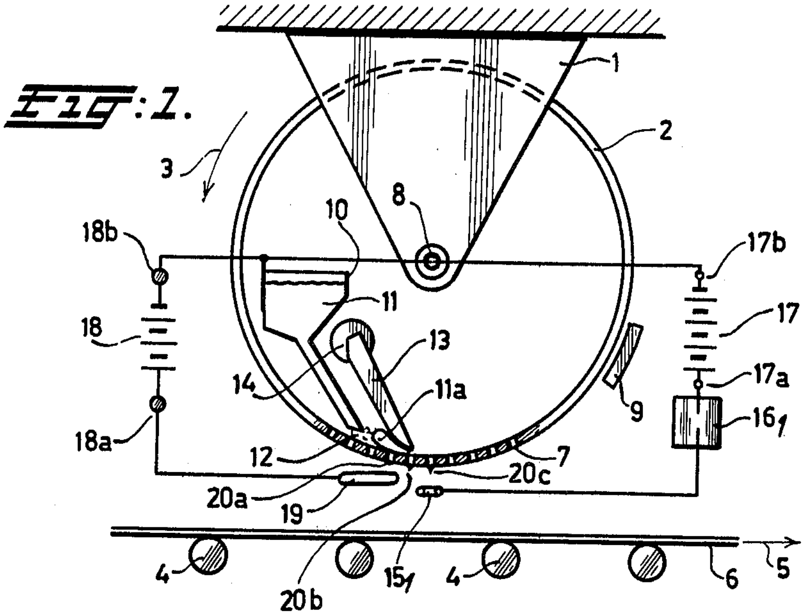
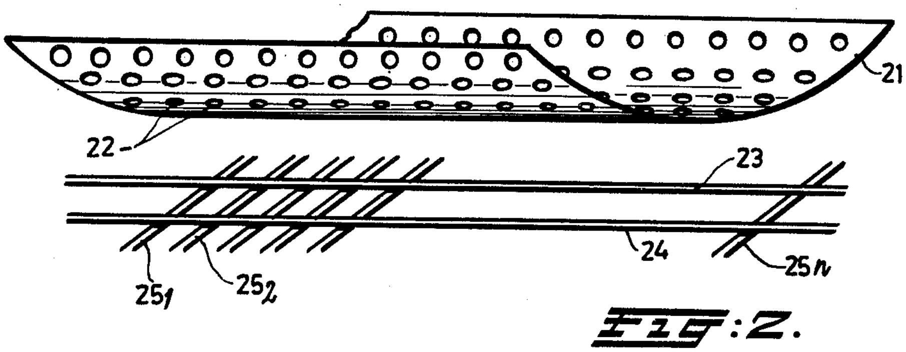
Fig. 2.
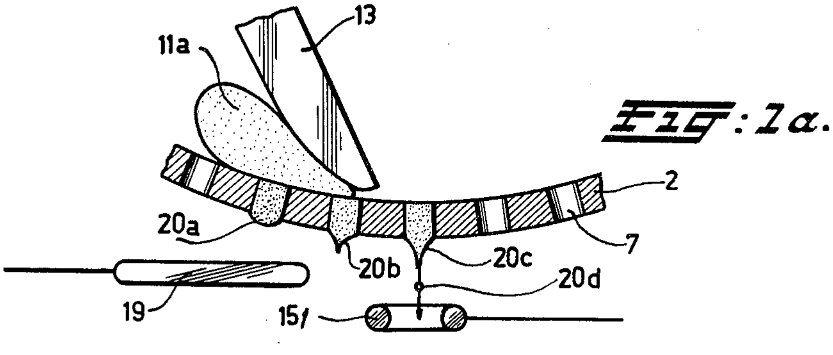
Fig. 1a.

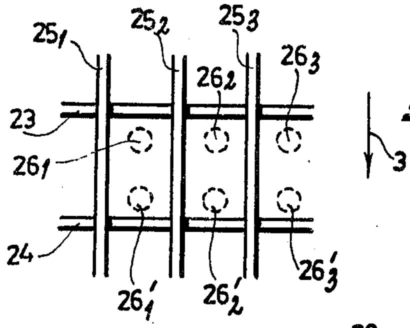
Fig: 3.
Fig: 4.
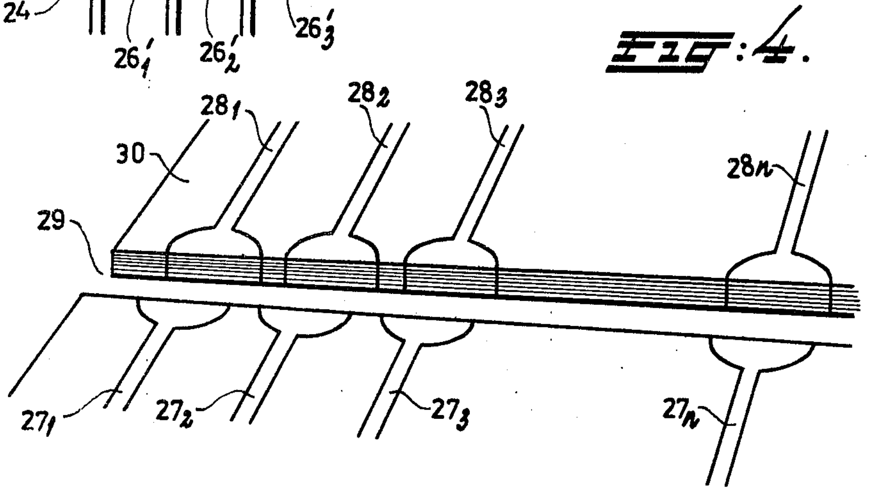
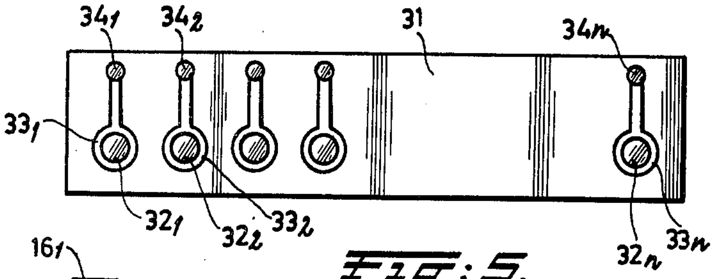
Fig: 5.
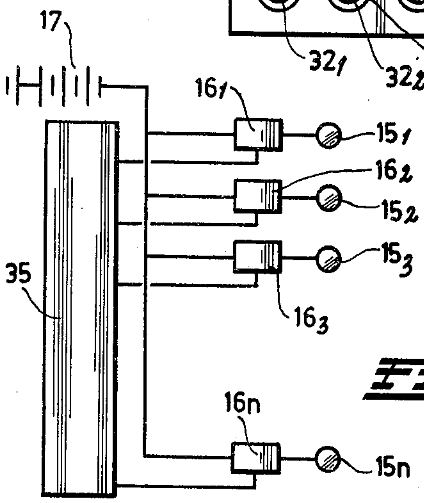
Fig: 6.

APPARATUS FOR PRINTING MATERIALS

BACKGROUND OF THE INVENTION

The present invention relates to an apparatus for printing materials, comprising a number of capillary dropdispensing apertures to be fed with the electrically conducting printing fluid, at least one electrode being arranged in the vicinity of the dispensing aperture, and means for generating a voltage difference between the fluid and the electrode.

DISCUSSION OF THE PRIOR ART

The principle of such a way of printing is known from U.S. Pat. No. 3,060,429.

It is possible to arrange a number of such capillary dropdispensing apertures in a series and to print a web of material moving thereunder by means of a suitable excitation. It is a drawback, however, that a number of drops which can be formed per time-unit by laying the electric field is limited since a comparatively long period of time is required for forming the convex meniscus and for deforming this convex surface by means of electrostatic forces to a funnel-shaped surface, at the point of which a drop may be separated. In actual practice the frequency at which the individual drops can be formed is limited to about 3000 Hz.

SUMMARY OF THE INVENTION

The invention aims to obviate this drawback by providing an apparatus of the type described hereinbefore by means of which a web of material, moving at a high velocity can be printed so that an industrial application of the principle known per se may be realized.

According to the invention, the apertures are thereto formed in the wall of a rotating body above a web of moving material to be printed, said body being rotatingly driven in such a manner that its peripherical speed has a component directed toward the direction of motion of the web of material.

The underlying idea is as follows: Bridging the period of time required for forming a meniscus. By rotating this rotating body at a defined velocity in the direction of the web for such a length of time that the meniscus can be formed, whereby at the moment the drop is to be dispensed the intensity of the field on the spot of the dispensing aperture has such a value that, indeed, a drop is formed, the object in view is achieved. In connection herewith, an auxiliary electrode may be used in combination with means for generating a potential difference between this auxiliary electrode and the fluid in such a manner that a convex fluidmeniscus is formed at the dispensing aperture located above the auxiliary electrode. In combination herewith, also means may be applied for raising the fluid pressure to such an extent that a convex fluid-meniscus is formed at the dispensing apertures; for this purpose, for instance, a squegee may be used.

Inside the rotation body there may be arranged a device for feeding the fluid which is connected with a nozzle arranged on the inner wall of the cylinder and which covers the perforated length of the cylinder.

A device for cleaning the outer rotation surface, is disposed in the sense of rotation of the rotation body behind the electrodes.

The rotation body is preferably formed by a cylinder.

The auxiliary electrode is preferably made of a pair of oblong electrically conductive elements located in the longitudinal direction of the rotation surface.

Various configurations of electrodes are possible. For instance, the electrodes may be formed by a number of electrically conductive elements located next to each other and transversely on the longitudinal axis of the rotation body, these elements being excited in pairs. It is also possible that the electrodes are formed by a number of electrically conductive annular elements located next to each other and to be excited independent of each other.

Furthermore, they may be formed by a number of electrically conductive coatings precipitated on an insulating carrier.

SURVEY OF THE DRAWINGS

FIG. 1 shows a schematic cross-section of an embodiment according to the invention;

FIG. 1*a* shows a detail of FIG. 1 on an enlarged scale;

FIG. 2 is a perspective view on an enlarged scale of part of the rotation body according to FIG. 1 in combination with the electrodes applied;

FIG. 3 is a top view of part of the electrodes' configuration;

FIG. 4 is a perspective view of another possible configuration of electrodes;

FIG. 5 shows a top view of another possible structure of the electrodes;

FIG. 6 elucidates schematically the manner in which the electrodes may be excited.

DESCRIPTION OF A PREFERRED EMBODIMENT

In FIG. 1, which illustrates a schematic cross-section of an embodiment according to the invention, indicated by reference numeral 1, a support for a rotating cylinder 2 suspended thereon, which, by means of suitable driving means (not shown) may be driven rotatingly in the direction of arrow 3, is illustrated. Below this cylinder there is a number of rollers 4 on which by driving means (not shown) a web of material 6 to be printed is moved in the direction of arrow 5; the velocity of cylinder 2 and that of web 6 are synchronized in respect of each other; the circumferential velocity of the cylinder will be equal to at least the linear velocity of the web of material 6 to be printed.

On the circumference of the cylinder, a number of capillar apertures 7 is made, arranged in series and parallel to the longitudinal axis 8 of the drum. Furthermore, the figure shows schematically a device 9 for cleaning the outer surface of cylinder 2.

In the cylinder there is a device 10 filled with the electrically conducting ink 11 to be used for printing, this ink being distributed evenly on the inner circumference of the cylinder via at least one nozzle located parallel to the longitudinal axis 8, so that a layer of ink 11*a* is formed for a squeegee 13 carried by a support 14.

Below the cylinder, arranged in a row parallel to axis 8, there is arranged a number of angular electrodes $\mathbf{15}_1 \ldots \mathbf{15}_n$, each of which is connected, via a suitable (for instance electronic) switch $\mathbf{16}_1 \ldots \mathbf{16}_n$ controled as desired, with the first terminal 17*a* of a voltage-source 17 of which the other terminal 17*b* is connected with the frame 1, the reservoir 10 and the terminal of equal polarity 18*b* of a second voltage-source 18 with different or equal voltage, the other terminal 18*a* of which is connected with an auxiliary electrode 19 which is here carried out as a long narrow strip.

The apparatus operates as follows:

By the rotation of the drum 2, fluid-menisci will be formed in the dispensing apertures which, as soon as located above the auxiliary electrode 19, as a consequence of the potential difference existing between the auxiliary electrode, on the one hand, and the electrically conductive fluid, on the other hand, form fluid menisci which (see particularly FIG. 1*a*) will pass successively from a convex form, as indicated by reference numerals 20*a*, 20*b*, to a funnel-shape, as indicated by reference numeral 20*c*, from which funnel-shape, when the electrode 15 is excited by closing the switch 16, a drop 20*d* is extracted which is precipitated on the surface moving with the cylinder. If all of the electrodes 15 in a series are excited simultaneously, a line perpendicular to the direction of movement is printed on the material; it is self-evident that by carrying out the excitation of the electrodes selectively as regards place and time, any pattern may be printed on the material.

FIG. 2 shows in perspective a portion of a cylinder wall 21 with the dispensing apertures 22 arranged in series; thereunder two oblong auxiliary electrodes 23, 24 are arranged parallel to the longitudinal axis of the cylinder (not shown) and a number of exciting electrodes $25_1$, $25_2$ to $25_n$ standing transversely on and crossing the longitudinal axis of the cylinder which are isolated from each other and from the auxiliary electrodes 23, 24.

FIG. 3 shows a top view of a portion of this configuration of electrodes.

If on the electrodes 23, 24 (see FIG. 3) a suitable first voltage is applied in such a manner that the fluid meniscus in the drop-dispensing apertures $26_1 \ldots 26_n$ arranged in a series and shown schematically within the electrodes, will deform, then upon further movement of these dispensing apertures in the direction of the arrow 3 to the schematically illustrated positions $26'_1$, $26'_2 \ldots 26'_n$ a drop will be extracted from the aperture which has then taken up the position $26'_1$ upon excitation of the pair of electrodes $25_1$, $25_2$; if to the contrary the pair of electrodes $25_2$, $25_3$ is excited, a drop will be extracted from the aperture in the position $26'_2$. By a suitable choice of the excitation of each time a number of pairs of electrodes a suitable pattern of ink drops may be formed on the web of material in the same manner as described for angular electrodes.

FIG. 4 shows a possible embodiment of the excitation electrodes; here they are arranged in the shape of metallic, particularly copper, coatings $27_1$, $27_2$, $27_3 \ldots 27_n$, $28_1$, $28_2$, $28_3 \ldots 28_n$ on an insulating bearer 30 provided with a longitudinal slot 29. For arranging the electrodes, the technics known as such for making printed circuits may be applied. This also applies to the embodiment of FIG. 5, whereby a number of apertures $32_1$, $32_2 \ldots 32_n$ is made in an insulating bearer 31 and whereby each aperture is surrounded by an electrically conductive coating $33_1$, $33_2 \ldots 33_n$ which, via an oblong coating, is connected with the contact eye $34_1 \ldots 34_n$.

FIG. 6 shows schematically the manner in which the electrodes in the case of FIG. 1 may be excited. The switches $16_1 \ldots 16_n$ connect the voltage-source 17 with the respective electrodes $15_1 \ldots 15_n$; the switches $16_1 \ldots 16_n$ are controled by address-logic 35 directed according to program.

With the apparatus according to the invention starting from a single cylinder in the surface of which a larger number of capillar dispensing apertures is made, any printed pattern can be realized on a fast moving web of material by correct excitation of the electrodes so far as the electrode chosen and the moment of excitation are concerned. Of course, for multicolor printing more cylinders as described above, will be used.

What is claimed is:

1. An apparatus for printing on a web of material comprising a rotatable cylindrical body containing an electrically conductive printing fluid and having a wall with capillar drop-dispensing apertures therein, said cylindrical body being positioned above a moving web of material to be printed and rotatable in such a direction that the circumferential velocity of the body adjacent the web has a component in the same direction as the direction of movement of the web, a plurality of control electrodes positioned between the web of material to be printed and the rotatable body in the vicinity of said apertures, means connected to said control electrodes for selectively generating a voltage difference between said printing fluid and the control electrodes, at least one auxiliary electrode positioned between said control electrodes and said rotatable body, and second means connected to said auxiliary electrode for generating a voltage difference between said auxiliary electrode and the printing fluid such that a convex fluid-meniscus is formed on the dispensing apertures as said apertures move above said auxiliary electrode.

2. An apparatus as claimed in claim 1 and further comprising means for raising the fluid pressure within the rotatable body to such an extent that a convex fluid-meniscus is formed on the dispensing apertures.

3. An apparatus as claimed in claim 2, wherein said means comprises a squeegee.

4. An apparatus as claimed in claim 1 wherein inside the rotating body there is a means connected with a nozzle arranged on the inner wall of the cylindrical body and covering the perforated length of said cylindrical body for feeding the printing fluid.

5. The apparatus as claimed in claim 1 wherein the auxiliary electrode comprises a pair of oblong electrically conducting elements located in the longitudinal direction of the rotating cylindrical body.

6. The apparatus as claimed in claim 5 and further comprising exciting electrodes comprising a number of electrically conducting elements located next to each other and arranged transversely on the longitudinal axis of the rotating body, said elements being excited in pairs.

7. The apparatus as claimed in claim 5 and further comprising exciting electrodes comprising a number of electrically conducting elements located next to each other and excited independently of each other.

8. The apparatus as claimed in claim 1 wherein the auxiliary electrodes comprise electrically conducting coatings precipitated on an insulating bearer.

* * * * *